United States Patent [19]

Nicolin

[11] 4,387,906
[45] Jun. 14, 1983

[54] TOOL OR WORKPIECE CHUCKING DEVICE

[75] Inventor: Curt Nicolin, Grödinge, Sweden

[73] Assignee: Eminentverktyg A.B., Eskilstuna, Sweden

[21] Appl. No.: 197,934

[22] Filed: Oct. 17, 1980

[30] Foreign Application Priority Data

Oct. 19, 1979 [SE] Sweden ................................ 7908691

[51] Int. Cl.³ ...................... B23B 31/20; B23B 31/30; B23B 31/40
[52] U.S. Cl. ..................................... 279/2 A; 279/4; 279/52
[58] Field of Search ............... 279/2 R, 2 A, 4, 52, 279/1 Q

[56] References Cited

U.S. PATENT DOCUMENTS

| | | | |
|---|---|---|---|
| 2,911,222 | 11/1959 | Eve | 279/4 |
| 3,010,568 | 11/1961 | Annegarn | 279/4 X |
| 3,542,354 | 11/1970 | Fitzpatrick | 279/4 X |
| 3,592,482 | 7/1971 | Better et al. | 279/4 |
| 3,679,219 | 7/1972 | Cameron | 279/4 X |
| 3,762,730 | 10/1973 | Cameron | 279/4 |

Primary Examiner—Z. R. Bilinsky

[57] ABSTRACT

A chucking device for tools or workpieces having a cylindrical or slightly conical chucking surface. The chucking device includes body (1), which is provided with truncated cone-shaped surface (3), cavity (4) located inside the surface and along a substantial portion of the axial extension thereof, and a pressurizing member located in body (1), by which the cavity as desired can be subjected to pressure by means of a medium. The device further includes holder (9) for tool (11) or workpiece (18) which is provided with a surface having a conical shape substantially corresponding to that of body (1), cylindrical surface (10) which is concentric with the conical surface, and slits (12) which are open at one end and extend through the wall of the holder. The device also includes clamp ring (15) which can be screwed on threads arranged in the body concentrically with the conical surface for causing the conical surface of the holder to contact the conical surface of the body.

5 Claims, 2 Drawing Figures

TOOL OR WORKPIECE CHUCKING DEVICE

BACKGROUND OF THIS INVENTION

This invention relates to a device for chucking a tool or a workpiece having a cylindrical chucking surface, for example to a machine tool for driving the tool or workpiece. Conventional chucking devices for such a tool comprise a chuck with a cone-shaped aperture, in the axial direction of which a clamp ring can be screwed on the chuck. The tool, together with a cone-shaped insert member, in the central hole of which the cylindrical tool shank is received, are inserted into the cone-shaped aperture of the chuck and by means of the clamp ring, a portion of which engages the insert end, are pressed into said aperture. Due to the co-operation of the conical surfaces and the insert being slit, the insert clamps about the shank and at the same time the friction between the conical surfaces locks the insert with the tool against rotation relative to the chuck.

The tolerances for the dimensions between the conical surfaces of the chuck and insert as well as between the cylindrical surfaces of the insert and chuck must be small for bringing about the desired chucking force and precision. The tightening torque in the clamp ring yet must be high for causing the conical and cylindrical surfaces to contact each other with sufficient force.

In order to avoid to some extent the requirement of double tolerances, the tool shank can be formed conically so as to fit directly in the cone-shaped aperture of a chuck. This, however, in its turn implies higher tool costs compared with a tool having a cylindrical shank. It is also known within a certain technique to clamp, for example a tool with cylindrical shank, directly in a chuck, where the clamping force is brought about by hydraulic pressure, which acts in a hollow space in the chuck and elastically expands the aperture sides of the chuck, thereby clamping the cylindrical tool shank inserted into the aperture. By using two co-operating cylindrical surfaces for chucking, very high requirements for the dimension tolerances of the chuck and tool must be met for obtaining the desired clamping force and precision for the tool.

As appears from the aforesaid, the known chucking devices have high tolerance requirements, this implies that damage on the surfaces in question cannot be accepted and, respectively, detrimentally affects the precision and chucking of the tool.

BROAD DESCRIPTION OF THIS INVENTION

The present invention solves the above-stated problem of ever increasing tool costs, and therewith of ever more expensive manufacturing operations, by means of the chucking device of this invention.

This invention eliminates the requirement of narrow tolerances between the chuck or corresponding member and the insert as well as between the insert and the tool or workpiece. This implies that even defects on the co-operating surfaces can be accepted to a certain extent.

This invention involves a chucking device for tools or workpieces having a cylindrical or slightly conical chucking surface. The chucking device includes a body, which is provided with a truncated cone-shaped surface, and a cavity located inside the surface and along a substantial portion of the axial extension thereof, and a pressurizing member located in the body, by which the cavity as desired can be subjected to pressure by a medium. The device further includes a holder for the tool or workpiece which is provided with a surface having a conical shape substantially corresponding to that of the body, a cylindrical surface which is concentric with the conical surface, and slits which are open at one end and extend through the wall of the holder. The device also includes a clamp ring which can be screwed on threads arranged in the body concentrically with the conical surface for causing the conical surface of the holder to contact the conical surface of the body.

DETAILED DESCRIPTION OF THIS INVENTION

Figure 1:
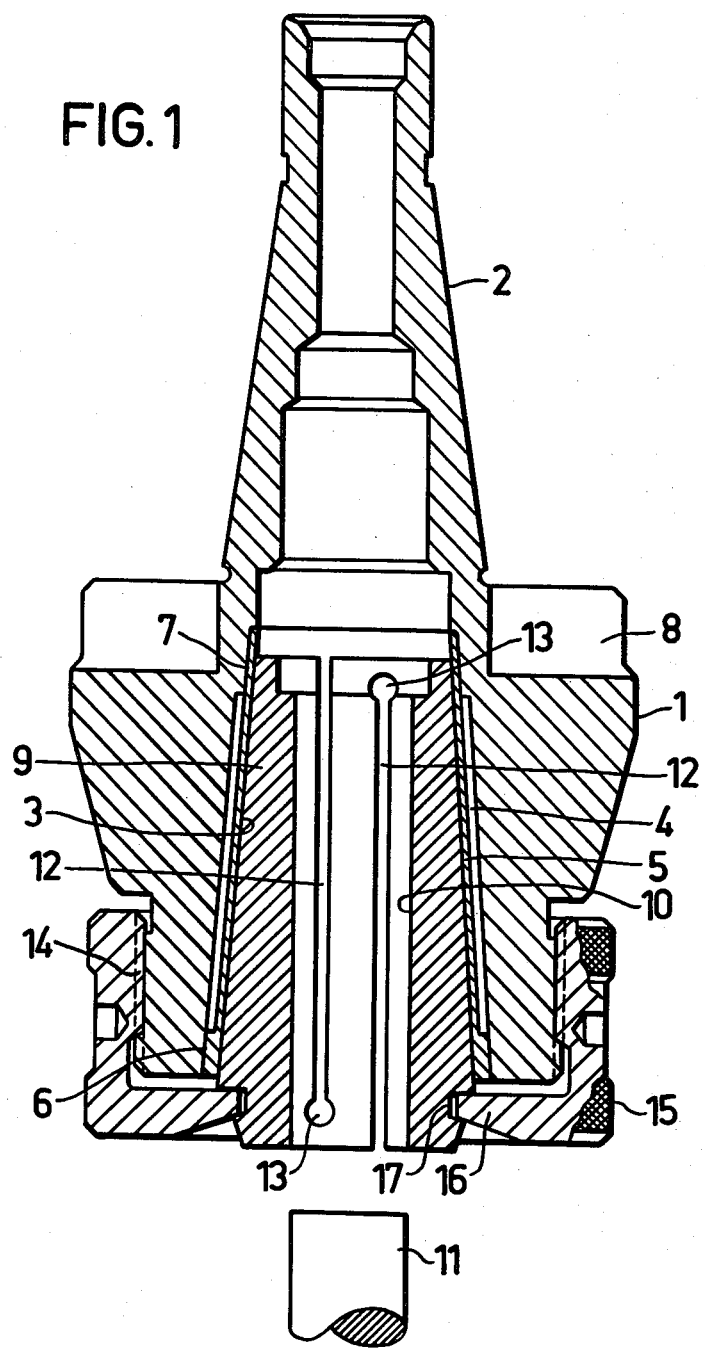
Figure 2:
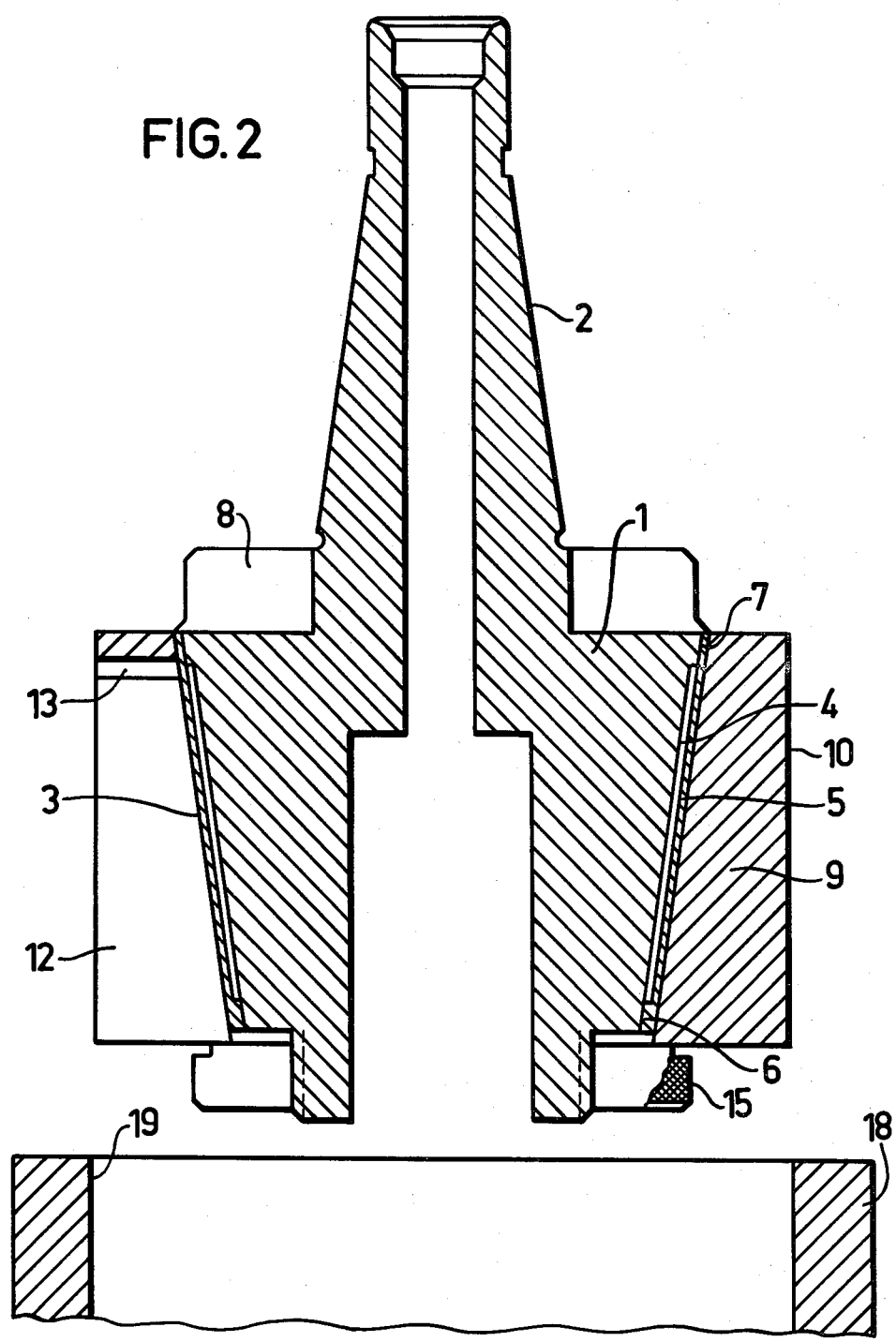

This invention is described in greater detail in the following description of two embodiments, with reference to the accompanying drawings. In the drawings:

FIG. 1 shows an embodiment of the chucking device according to this invention, and FIG. 2 shows another embodiment of said device.

The chucking device comprises body 1, which by means of its shank 2 is intended to be clamped in the spindle of machine tool. The body according to FIG. 1 is provided with aperture 3 of truncated cone shape. Inside of the conic surface and about the same cavity 4 is located. The axial extension of cavity 4 constitutes a substantial portion of the axial extension of said surface. Cavity 4 preferably is formed so that in said body a conical hole having a diameter corresponding to the outer diameter of the cavity and having a length corresponding to the axial extension of the cavity is made. Whereafter sleeve-like cone-shaped insert 5 is introduced into said hole and sealed therein by press fit and soldering along the peripheries designated by 6 and 7.

In said body 1 a pressurizing member known per se, for example in the form of a thrust screw and piston, is located which via a conduit communicates with cavity 4. Said pressurizing member is well-known to the expert and constitutes no part of this invention and, therefore, it is not described in detail nor shown in the drawing. A fluid, for example oil, fills cavity 4 and is acted upon via the conduit by the piston. Numeral 8 designates dogs, which are arranged a normal manner and co-operate with the machine tool when the body is being clamped therein.

Holder 9 has a cone-shaped outside corresponding to the conical shape of aperture 3 is insertible in said aperture. Holder 9 further includes cylindric bore 10, which is co-axial with said conical surface and intended to receive a cylindrical shank 11 of a tool, for example a drill. Holder 9 is further provided with slits 12, preferably eight in number, which are open at one end and extend through the holder and terminate at the other end thereof in groove 13. The axial position of the open ends of the slits and of the groove change regularly in relation to the ends of the holder, as appears from FIG. 1 where only two slits are shown.

Body 1, at the end where holder 9 is inserted, is provided with threads 14, onto which clamp ring 15 can be screwn. Ring 15 is provided with collar 16, which with its inner edge engages with groove 17 of holder 9. The end of holder 9 is resilient in the diameter direction, so the ring can be applied onto the holder, into which thereafter shank 11 of the tool is inserted. Thereby a one-piece tool member (tool, holder, clamp ring) is obtained which can be attached in body 1. The conical surfaces can be caused by the clamp ring 15 to abut each other with the desired, not necessarily great force. The pressurizing member is actuated and thereby subjects cavity 4 to hydraulic pressure. The walls of aperture 3, i.e. sleeve-like insert 5, are thereby elastically pressed inward and against holder 9, which thereby clamps the tool received therein. Irrespective of whether or not clamp ring 15 has been tightened, the tool is held safely in body 1 when subjected to the forces herein involved. Small variations in conicity between aperture 3 and holder 9 do not affect the said holding, which is also not affected, by small variations between cylindrical bore 10 and shank 11.

FIG. 2 shows body 1 provided with an outside surface having a truncated cone shape which is located inside of surface 3. Cavity 4 is located between surface 3 and the outside surface of body 1. Said cavity has been brought about by turning down diameter of the body 1 to a diameter corresponding to the inner diameter of the cavity, and by pushing sleeve-like member 5 on the body and soldering said member thereon along peripheries 6 and 7. The holder used here is sleeve 9, the inner opening of which has a truncated cone shape, and the outside of which is cylindrical (10). The sleeve is provided with a suitable number of slits 12 in a manner corresponding to the holder mentioned with reference to FIG. 1. Sleeve 9 can be applied to the body by means of clamp ring 15 as shown in FIG. 2. The object to be clamped, in this case workpiece 18, has at the embodiment shown the form of a ring member provided with cylindrical hole 19. Workpiece 18 is clamped on the body in a manner corresponding to that for tool 11, by applying pressure to cavity 4 by means of the thrust member, whereby conical wall 5 of the body expands elastically and thereby clamps workpiece 18 via sleeve 9.

Owing to the conicity between details 1 and 9, the dimension tolerances are not high, without, however, neglecting the clamping accuracy for the tool or workpiece to be worked. At the same time, a safe clamping of the tool or workpiece is obtained. It is, of course, possible within the scope of the invention idea to imagine cavity 4 be divided into two or more cavities supplied with hydraulic pressure.

What I claim is:

1. A chucking device for a tool or workpiece having a cylindrical or slightly conical chucking surface comprising (a) a body, which is provided with a truncated cone-shaped surface, (b) a cavity located in said body inside of said cone-shaped surface of said bodies and along a substantial portion of the axial extension of said cone-shaped surface of said body and (c) a fluid-utilizing pressurizing member located in said body, by means of which member said cavity can be subjected to pressure as desired by means of said fluid, and (d) a holder for the tool or workpiece which is provided with a surface having a cone-shaped shape substantially corresponding to that of said body, a cylinder-shaped surface concentric with said cone-shaped surface of said holder, and with slits open at one end and extending through the wall of said holder, and (e) a clamp ring, which can be screwed on threads arranged in said body concentrically with said cone-shaped surface of said holder for causing said cone-shaped surface of said holder to contact said cone-shaped surface of said body.

2. The chucking device as claimed in claim 1 wherein said truncated cone-shaped surface of said body forms the wall of an aperture, the outside of said holder has a truncated cone-shape, and said holder includes a base end located towards the end of said chucking device into which the tool or workpiece is inserted and a cylindrical bore completely therethrough which forms said cylindrical surface of said holder.

3. The chucking device as claimed in claim 1 wherein said clamp ring is provided with a collar, which forms a circular opening having a diameter smaller than the outer diameter of the base of said holder, and said holder is provided at its base end with a groove for receiving said collar.

4. The chucking device as claimed in claim 1 wherein said truncated cone-shaped surface of said body forms the outside of said body, and said holder is provided with a hole of conical shape, in such a manner, that the outside of said holder forms said cylindrical surface of said holder.

5. The chucking device as claimed in claim 1 wherein said slits in said holder alternative in direction of the end openings thereof.

* * * * *